(12) United States Patent
Ghorbani

(10) Patent No.: US 11,184,147 B2
(45) Date of Patent: Nov. 23, 2021

(54) HYBRID ENCRYPTION FOR CYBER SECURITY OF CONTROL SYSTEMS

(71) Applicant: University of Hawaii, Honolulu, HI (US)

(72) Inventor: Reza Ghorbani, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 164 days.

(21) Appl. No.: 16/471,974

(22) PCT Filed: Dec. 21, 2017

(86) PCT No.: PCT/US2017/068028
§ 371 (c)(1),
(2) Date: Jun. 20, 2019

(87) PCT Pub. No.: WO2018/119315
PCT Pub. Date: Jun. 28, 2018

(65) Prior Publication Data
US 2020/0099508 A1   Mar. 26, 2020

Related U.S. Application Data

(60) Provisional application No. 62/437,611, filed on Dec. 21, 2016.

(51) Int. Cl.
*H04L 9/00* (2006.01)
*G06N 3/04* (2006.01)
*H04L 9/06* (2006.01)
*H04L 9/32* (2006.01)

(52) U.S. Cl.
CPC ........... *H04L 9/001* (2013.01); *G06N 3/0418* (2013.01); *H04L 9/008* (2013.01); *H04L 9/0637* (2013.01); *H04L 9/3249* (2013.01)

(58) Field of Classification Search
CPC ....... H04L 9/001; H04L 9/008; H04L 9/0637; H04L 9/3249; H04L 63/0815; H04L 63/083; H04L 63/0853; G06N 3/0418; G06N 3/08; G06F 21/35; G06F 2221/2117; G06F 2221/2119
See application file for complete search history.

(56) References Cited

U.S. PATENT DOCUMENTS 6,014,445 A * 1/2000 Kohda .................... H04L 9/001
                                                    380/28
7,093,137 B1 * 8/2006 Sato ..................... G06F 21/6227
                                                    380/277
(Continued)

FOREIGN PATENT DOCUMENTS

CN          101977112 A       2/2011

OTHER PUBLICATIONS

Kaur H. et al. "Cryptography Using Chaotic Neural Network"; International Journal of Information Technology and Knowledge Management, vol. 4, No. 2; Publication [online]. Dec. 2011 [retrieved Feb. 1, 2018]. Retrieved from the Internet: pp. 417-422.

*Primary Examiner* — Abu S Sholeman
(74) *Attorney, Agent, or Firm* — Blank Rome LLP

(57) ABSTRACT

A hybrid method and system for data encryption significantly reduces the computational cost of encryption and reduces the cost of the processors needed to perform encryption and decryption.

20 Claims, 9 Drawing Sheets

(56) References Cited

U.S. PATENT DOCUMENTS

| | | | |
|---|---|---|---|
| 8,687,810 B2* | 4/2014 | Bukshpun | H04L 9/14 |
| | | | 380/263 |
| 8,917,871 B2* | 12/2014 | Wang | H04L 9/0668 |
| | | | 380/277 |
| 10,417,650 B1* | 9/2019 | Gong | G06Q 30/0202 |
| 2003/0161467 A1* | 8/2003 | Cheng | H04L 9/12 |
| | | | 380/44 |
| 2003/0182246 A1* | 9/2003 | Johnson | G06Q 20/3821 |
| | | | 705/76 |
| 2010/0219858 A1* | 9/2010 | Ditto | H03K 19/20 |
| | | | 326/37 |
| 2012/0250863 A1* | 10/2012 | Bukshpun | H04L 9/14 |
| | | | 380/278 |
| 2016/0350648 A1* | 12/2016 | Gilad-Bachrach | G06N 3/0481 |
| 2016/0357980 A1* | 12/2016 | Balasubramanian | |
| | | | H04L 9/0822 |
| 2020/0285983 A1* | 9/2020 | Bhattacharyya | G06N 7/005 |

* cited by examiner

HYBRID ENCRYPTION FOR CYBER SECURITY OF CONTROL SYSTEMS

RELATED APPLICATIONS

This application is a U. S. National Stage Application of International Application No, PCT/US2017/068028, filed on Dec. 21, 2017, which claims priority of U. S. Provisional Application No. 62/437,611, filed on Dec. 21, 2016. The entire contents of these applications are incorporated herein by reference.

CROSS REFERENCE TO RELATED APPLICATION

This application claims benefit of U.S. Provisional Application No. 62/437,611, filed Dec. 21, 2016, the contents of which are hereby incorporated by reference herein.

FIELD OF THE INVENTION

The disclosed invention is in the field of cryptography.

BACKGROUND OF THE INVENTION

Computer networks and systems often comprise sensitive information that must be protected at all times to ensure the reliability and confidentiality of the systems and networks. One common approach to securing sensitive information is cryptography. There are many types of cryptography available for a myriad of different applications. One such type of cryptography is RSA cryptography, which involves the use of randomly generated prime numbers that are kept private. These numbers are then used to calculate different private keys. RSA cryptography uses the private keys in conjunction with public keys, which are shared with entities that wish to communicate with the entity that generated the private keys. Messages are encrypted using the public keys of a device receiving the message, and decrypted using the private key(s) of the device receiving the message.

The problem with RSA cryptography is that it is computationally expensive due to the possibility of using division operations, which makes RSA cryptography impractical for a cost-effective solution for real-time data transmissions.

Another type of cryptography is Chaotic Neural Network (CNN) cryptography. CNN cryptography is a faster method of encrypting information than RSA cryptography, while still maintaining security comparable to that of more computationally expensive ciphers. This permits CNN cryptography to have applications in devices that do not have as much computational power as a desktop computer.

The problem with CNN cryptography is that the initial values shared between devices are not secured, thus there is some vulnerability.

Therefore, there is a need for systems and methods to perform secure real-time encryption and decryption using minimal processing power in a Defense-in Depth (DiD) approach to help secure systems from cyberattack, for example industrial control systems.

SUMMARY OF THE INVENTION

The DiD strategy is a driving philosophy behind combining multiply types of encryption, for example a RSA-CNN cipher. It has been proven time and time again that no cybersecurity cipher or system architecture is hack proof. The goal is to make cracking the cipher take longer than the time required to detect the intrusion and start either manual or automated countermeasures. The present application combines several layers of defenses, for example by combining RSA encryption with CNN encryption, to achieve secure encryption and decryption using minimal processing power.

A first layer is the RSA encryption of two values, $\alpha$ and $x_o$, that are used to start a CNN encryption process. Without the correct public and private key, $\alpha$ and $x_o$ will not be correct. The second layer is the $\alpha$ and $x_o$ that is needed in the CNN process; if those two values are incorrect, then the CNN will not decrypt to the correct values. The third layer is the CNN itself, if the neural network is not structured and trained in exactly the same way as the encrypting CNN, then it will not properly decrypt the values. A hostile entity would have to break through all three layers of that encryption at a minimum in order to gain access to the data. In addition, if there is any change to the RSA keys or the CNN, then the hostile entity essentially has to restart the attempt to crack the cypher. There can be multiple levels of authentication as well that can help prevent an unwanted entity from accessing these devices, such as passwords, password length, or device ID. By further encrypting these extra authentications in separate instances of CNN encryption, the multiple instances of random $\alpha$ and $x_o$ further increase the security of the cypher.

The present invention provides hybrid encryption methods, comprising the steps of: at a first device, generating a first set of initial values corresponding to a password and generating a second set of initial values corresponding to data to be encrypted; encrypting the password by chaotic neural network (CNN) encryption using the first set of initial values; encrypting the data by CNN encryption using the second set of initial values; RSA-encrypting first set of initial values and the second set of initial values; and transmitting all encrypted data to a second device.

The present invention provides hybrid encryption methods, comprising the steps of: at a first device, generating a plurality of initial values; passing the plurality of initial values into a first function and generating a chaotic noise vector; RSA-encrypting the plurality of initial values; passing plaintext and the chaotic noise vector into a chaotic function logic block and generating ciphertext; and transmitting the ciphertext and the RSA-encrypted initial values to a second device.

The present invention provides hybrid encryption methods, comprising the steps of: at a first device, passing an initial value through a first non-linear function and obtaining an encrypted value; and transmitting the encrypted value over a public domain to a second device; at a second device, receiving the encrypted value decrypting the encrypted value by using an inverse or an approximation of the inverse of the first non-linear function, resulting in a decrypted value; passing the decrypted value through at least one operation in order to determine whether a consensus between the first device and the second device is reached; outputting an encrypted predicted value from the at least one operation; passing the encrypted predicted value through at least a second non-linear function to obtain a new value; and transmitting the new value to the first device; and at the first device: receiving the new value and decrypting the new value by using an inverse or an approximation of the inverse of the second non-linear function, resulting in a new decrypted value; and passing the new decrypted value through at least one operation in order to determine whether a consensus between the first device and the second device is reached.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods and devices disclosed. In addition, the drawings are not necessarily drawn to scale. In the drawings.

DETAILED DESCRIPTION OF ILLUSTRATIVE EMBODIMENTS

Figure 1:
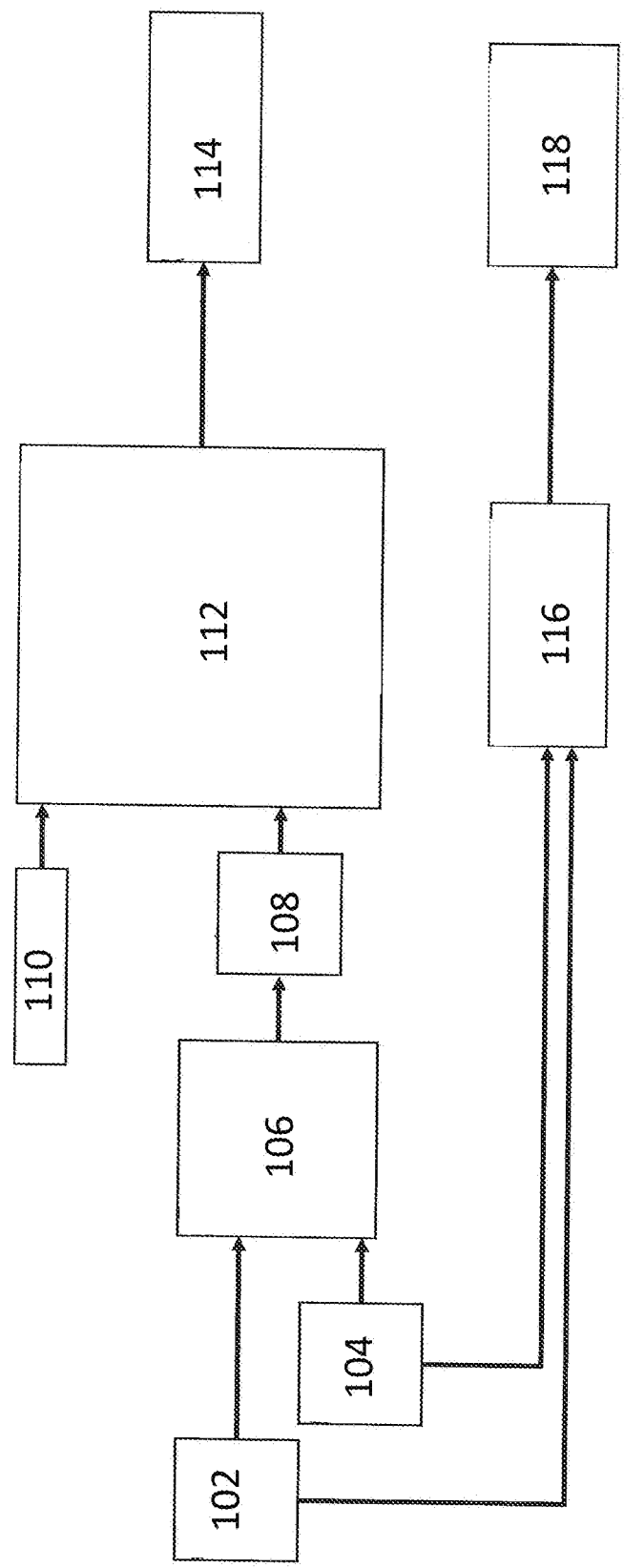
FIG. 1 is a flow diagram illustrating a hybrid encryption method in accordance with an embodiment.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, references to values stated in ranges include each and every value within that range.

A key idea behind CNN cryptography is that without the correct initial values and conditions in the CNN, then the results cannot be decrypted into anything of value to a hostile actor. Even a small difference between initial conditions would result in a vastly different signal being sent due to the random and chaotic nature of CNN encryption. Thus, the initial conditions, variables corresponding to the password and actual data (alphas), and the length of the password must be protected.

The initial CNN conditions may be transmitted in a safe, reliable manner by pairing CNN cryptography with another type of encryption, for example with RSA encryption. While RSA encryption is computationally expensive and thus impractical for devices with low computing power, it can be used in a more limited capacity when paired with CNN cryptography. For example, RSA encryption may be used to transmit initial conditions for the CNN functions used in the encryption, the two alphas (one for the password and one for the actual data), and the length of the password. The CNN encryption is used for both the password itself, and the actual data that is being transmitted, which allows for real-time encrypted communication between smaller, less computationally powerful devices. When the parameters of the CNN functions or the password changes, then another RSA encrypted communication occurs.

Generally, at a first device, a password is first changed from a string of letters to a double vector of numbers. Then the length of the password, the initial conditions of the CNN, and the alphas used in the CNN functions are encrypted using the RSA keys. The second device that receives the encrypted password then decrypts the password length using the RSA keys and determines if the password length matches the one it considers valid from the authorized database. If the length is correct, then the password is decrypted to see if the password is a verified one. This double step to verification of the password increases the security of the transmissions. The passwords that are exchanged are authorized and registered in a database identifying each device for security and organizational reasons. In addition, a device's password and the passwords of the devices that it is authorized to communicate with, are stored on the hardware of the device itself. If the password is deemed correct, then the CNN encrypted data is downloaded and decrypted using the RSA decrypted initial values and alphas for the CNN functions that encrypted the desired data. If, during any step of the password decryption, it is determined to not be correct in any way, a request is sent back to the original sender, requesting the correct password. The CNN encrypted data is not accepted and decrypted.

Depending on the security standards for the use of the device, the time frame between CNN encryption changes or new RSA key calculations can be changed. This combination of encryption schemes makes for a secure system to transmit data. In order to decrypt the transmitted data, or perhaps insert falsified data, the attacker would need knowledge on both RSA and CNN cryptography and how they are implemented with each other.

Turning now to FIG. 1, a flow diagram illustrating a hybrid encryption method 100 in accordance with an embodiment is illustrated. Two initial values, a 102 and $x_o$ 104 are randomly generated by a first device to start a chaotic sequence. The first device may be any device with a processor or microcontroller, for example appliances, smart meters, mobile communication devices, sensors, cameras, microphones, monitoring and measurement equipment, etc. The initial values α 102 and $x_o$ 104 are passed through a first function 106 to generate a chaotic noise vector 108. The chaotic noise vector 108 and the plaintext vector 110 are passed through chaotic functions 112 in order to encrypt the plaintext 110 into ciphertext 114. The initial values α 102 and $x_o$ 104 are also encrypted using RSA encryption. Alternatively, other forms of encryption may be used to encrypt initial values α 102 and $x_o$ 104, for example Blowfish, Twofish, AES, etc. Both the ciphertext 114 and the encrypted initial values α 102 and $x_o$ 104 are then transmitted to a second device.

The neural network used in the hybrid encryption method is known as a chaotic neural network. The initial values put into the network's input layer are randomized. This means that the path the input takes through the layers is different each time and without the correct initial value, the initial value cannot be decrypted. The input is randomized in the CNN through two values, α and $x_o$. These values themselves are randomized every time an encrypted message is sent. The CNN used in herein may have several layers, for example three layers, that serve to scramble the binary values of the data being encrypted.

The following paragraph details some of the code and math behind the CNN. First, the values of α and $x_o$ are randomly generated using the following equations:

$$\alpha = 0.45*\text{rand} + 0.04 \quad (1)$$

$$a = \alpha, b = 1 - \alpha \quad (2)$$

$$x_o = (b-a)*\text{rand} + a \quad (3)$$

Next, the values of μ and λ are created from α.

$$\mu = \frac{4}{1 - 2*\lambda} \quad (4)$$

$$\lambda = \alpha * \frac{(2*\alpha - 3)}{(1 - 2*\alpha)} \quad (5)$$

After μ and λ are generated, then the remaining values of x are generated using the following equation:

$$x = \mu * x(i-1) * (1 - x(i-1)) + \lambda \quad (6)$$

From x, the matrix b is generated and contains the binary representation of the values in x. The matrix b is then the input into the neural network to be encrypted further. First, each byte is given a weight and a value of θ in the first input layer.

```
for i=1:n
    for j=1:n
        if (b(c,i)==0)&&(i==j)
            weight(i,j)=1;
        elseif (b(c,i)==1)&&(i==j)
            weight(i,j)=-1;
        elseif i~=j
            weight(i,j)=0;
        end
    end
    if (b(c,i)==0)
        theta(i)=-1/2;
    else
        theta(i)=1/2;
    end
end
```

Then the values of weight, the original data in binary form, XX, and θ are used to generate a matrix, dx, in the second layer of the network.

```
for i=1:n
    %dx(c,i) = hardlim(sum(weight(i,:).*XX(c,:))+theta(i));
    if sum(weight(i,:).*XX(c,:))+theta(i) >= 0
        dx(c,i)=1;
    else
        dx(c,i)=0;
    end
end
```

The final layer of the network takes the binary values generated in the second layer and reconstitutes them as an 8-bit integer:

```
for i=1:n
    Y(c)=Y(c)+uint8(dx(c,i))*(2^(n-i));
end
```

The decryption code is structured similarly, but does not use the equations to generate the values of α and $x_o$. Instead, the correct α and $x_o$ are sent over in the data to ensure that the neural network goes along the same path. In an embodiment, only the α and $x_o$ values are encrypted using RSA encryption, while the rest of the data that is being sent is being encrypted using the CNN. It is to be understood that the above-example is one embodiment for implementing the CNN. However, a person of ordinary skill in the art would understand that other suitable implementations of CNN may also be used and remain within the scope of the invention.

Figure 2:
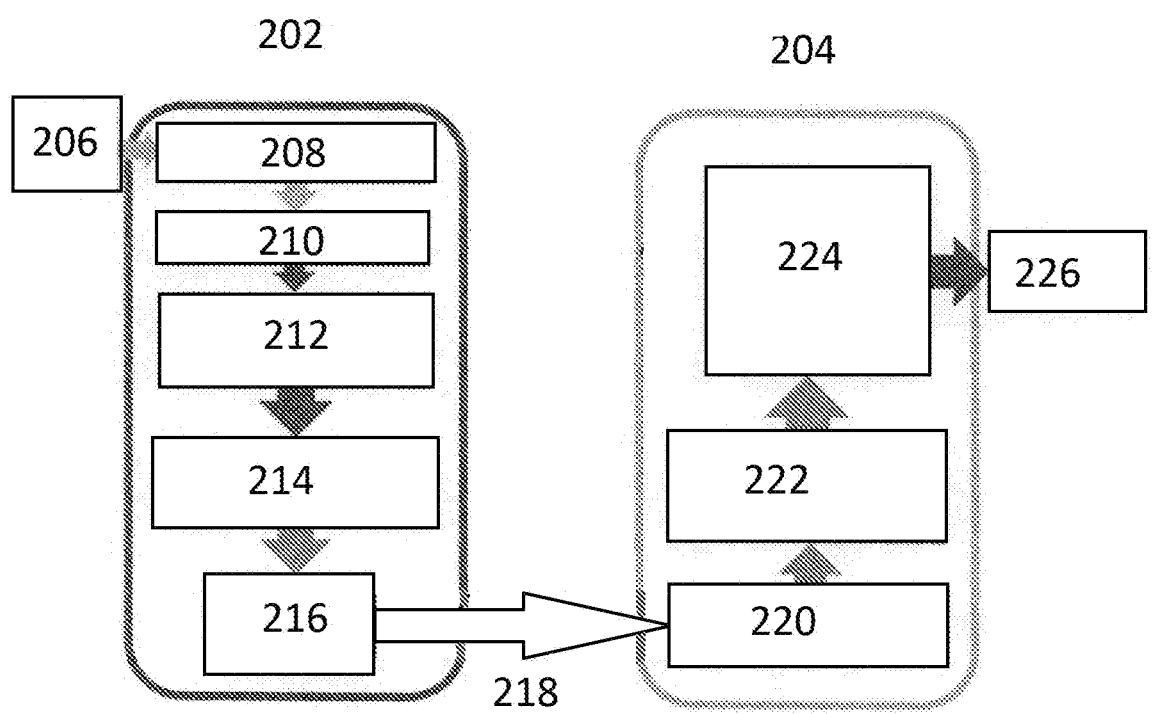
FIG. 2 is a flow diagram of a hybrid encryption method according to an embodiment.

FIG. 2 illustrates a flow diagram of an RSA-CNN encryption method 200 according to an embodiment. A first device 202 acquires data, encrypts the data, and sends the data to a second device 204. The first device 202 acquire data 208 from a data input 206. The first device then generates values for α and $x_o$ 210, and next CNN encrypts 212 the data 206 and password using a different α and $x_o$. Next, the first device 202 RSA encrypts 214 the α and $x_o$ used for the data, and also the α and $x_o$ used for the password. Finally, the first device sends 216 the encrypted data 218 to the second device 204.

The second device 204 receives the encrypted data 220. Next, the second device 204 RSA-decrypts 222 the α and $x_o$ corresponding to the password, and CNN decrypts the password itself. If the password matches, then the second device 204 RSA decrypts the α and $x_o$ associated with the data, and CNN decrypts the data itself 224, resulting in the decrypted data 226.

Figure 3:
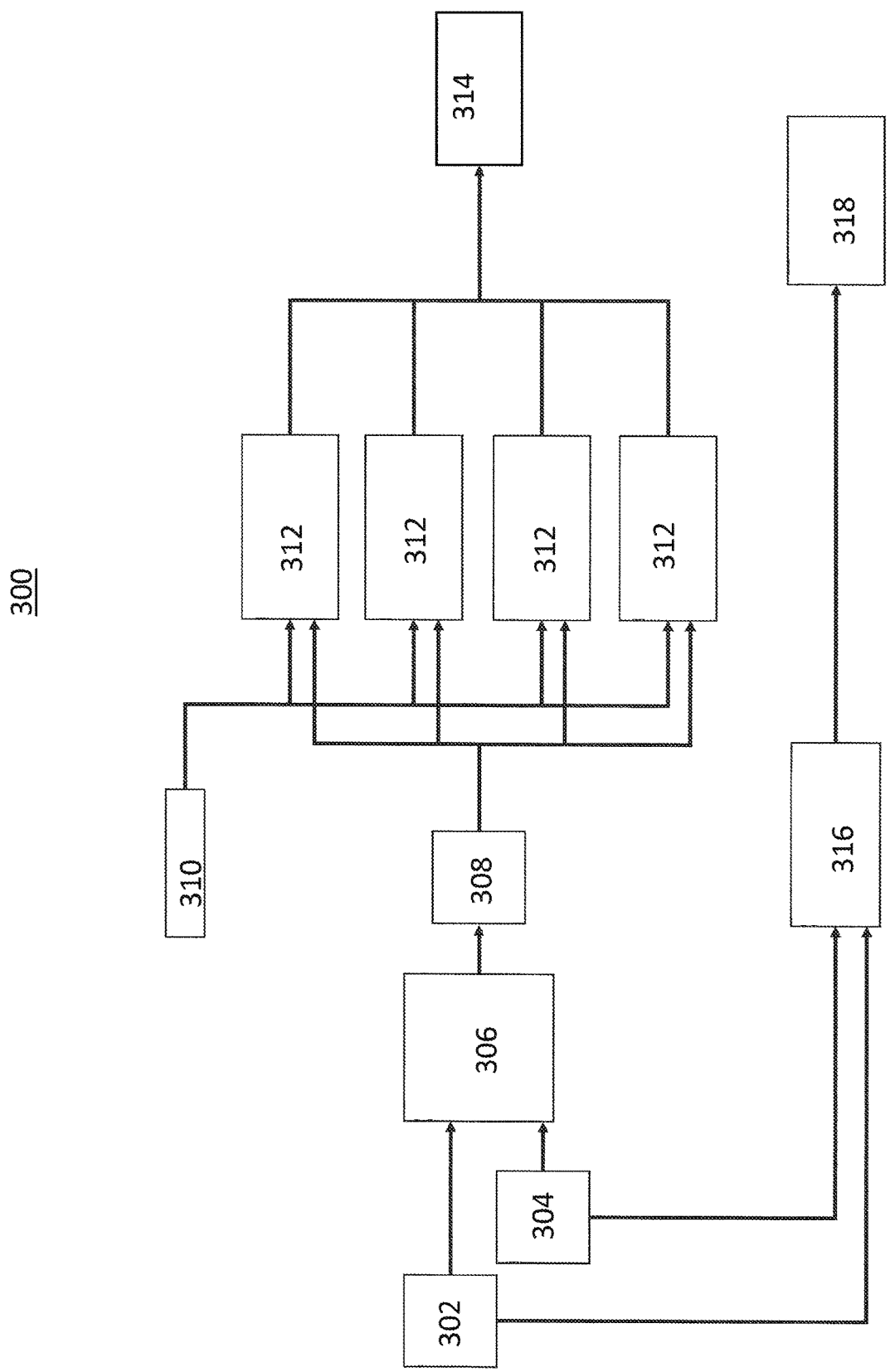
FIG. 3 is a flow diagram illustrating another hybrid encryption method in accordance with an embodiment.

FIG. 3 is a flow diagram illustrating another hybrid encryption method 300 in accordance with an embodiment. Method 300 is similar to method 100, but breaks the chaotic function logic box into a plurality of parallel chaotic function logic blocks to more rapidly encrypt the plaintext message. The additional chaotic function logic blocks (four total) can expedite the encryption by approximately a factor of four. The chaotic function logic blocks circuit blocks can perform parallel computations at each iteration, and thus with more chaotic function logic blocks, rapid encryption becomes possible.

Two initial values, α 302 and $x_o$ 304 are randomly generated by a first device to start a chaotic sequence. The initial values α 302 and $x_o$ 304 are passed through a first function 306 to generate a chaotic noise vector 308. The chaotic noise vector 308 and segments of a plaintext vector 310 are passed through parallel chaotic functions 312 in order to encrypt the plaintext 310 into ciphertext 314. The plaintext 310 may be broken up into small pieces, for example, 8 bits of the message may be sent to each parallel chaotic function 312 block at a time. Other lengths of the plaintext 310 may also be used. Furthermore, while FIG. 2 illustrates four parallel chaotic function blocks, it is understood that more or less chaotic function blocks may be employed depending on the application. Generally, the more parallel chaotic function blocks available, the faster the overall encryption process.

The initial values $\alpha$ 302 and $x_o$ 304 are encrypted using RSA encryption 316. Alternatively, other forms of encryption may be used to encrypt $\alpha$ 302 and $x_o$ 304, for example Blowfish, Twofish, AES, PGP (Pretty Good Privacy), etc. The segments of encrypted ciphertext are reassembled, and then the reassembled ciphertext 314 and the encrypted initial values $\alpha$ 302 and $x_o$ 304 are transmitted to a second device.

Figure 4:
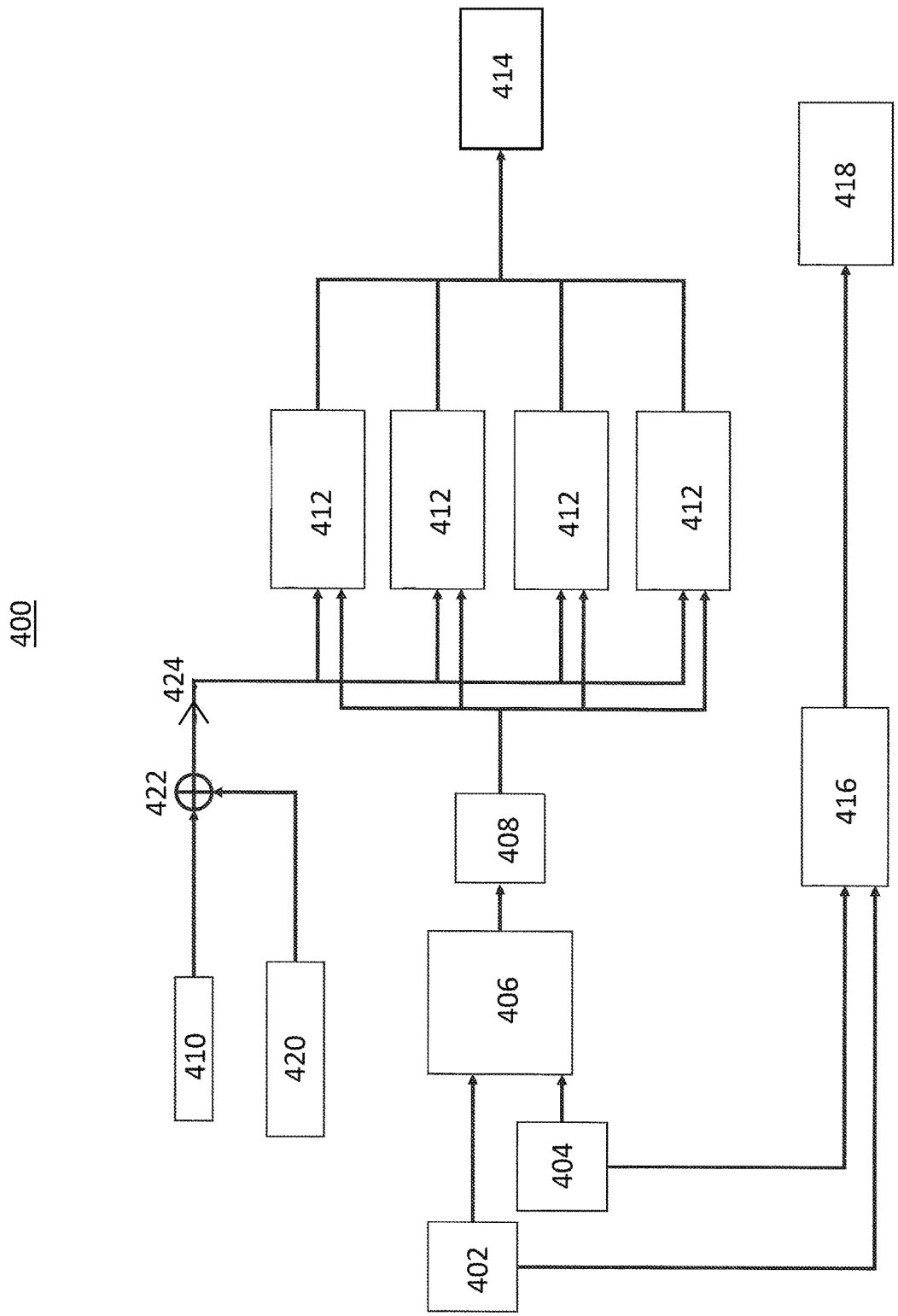
FIG. 4 is a flow diagram illustrating another hybrid encryption method 300 in accordance with an embodiment.

FIG. 4 is a flow diagram illustrating another hybrid encryption method 400 in accordance with an embodiment. The method 400 is similar to the method 200, but further includes a key register 420, which is passed through an exclusive-or (XOR) logic gate 422 along with the plaintext 410.

Two initial values, $\alpha$ 402 and $x_o$ 404 are randomly generated by a first device to start a chaotic sequence. The initial values $\alpha$ 402 and $x_o$ 404 are passed through a first function 406 to generate a chaotic noise vector 408. The chaotic noise vector 408 and segments of the XOR-ed plaintext 424 are passed through parallel chaotic function logic blocks 412 in order to encrypt the XOR-ed plaintext 424 into ciphertext 414. The XOR-ed plaintext 424 may be broken up into small pieces, for example, 8 bits of the message may be sent to each parallel chaotic function logic block 412 at a time. Other lengths of the XOR-ed plaintext 424 may also be used. Furthermore, while FIG. 4 illustrates four parallel chaotic function blocks, it is understood that more or less chaotic function blocks may be employed depending on the application.

The initial values $\alpha$ 402 and $x_o$ 404 are encrypted using RSA encryption 416. Alternatively, other forms of encryption may be used to encrypt initial values $\alpha$ 402 and $x_o$ 404. The segments of encrypted ciphertext are reassembled, and then the reassembled ciphertext 414 and the encrypted initial values $\alpha$ 402 and $x_o$ 404 are transmitted to a second device.

Figure 5:
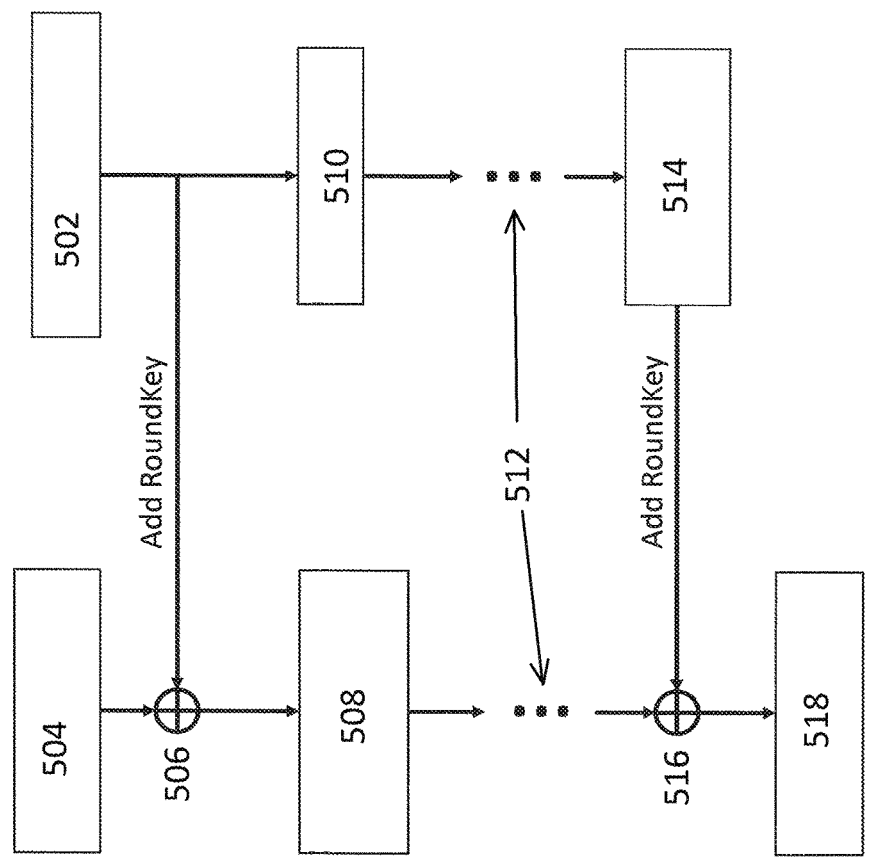
FIG. 5 is a flow diagram illustrating a method for encrypting data in accordance with an embodiment.

FIG. 5 is a flow diagram illustrating a method 500 for encrypting data. Key register 502 and plaintext 504 are passed through an XOR logic gate 506. The resulting vector is passed through a chaotic function logic box 508 to encrypt the data. Meanwhile, the key register 510 is updated. These steps repeat n times until the key register 510 is updated for the final operation. Then the final key register 514 and transformed plaintext 504 are passed through the XOR logic gate 516, and the resulting ciphertext 518 is transmitted to another device. This method provides alternatives to hashing with light-weight encryption. For example, this method may be used when a signature needs to be sent for verification. Other applications may include cryptocurrency or blockchain, among others.

Figure 6:
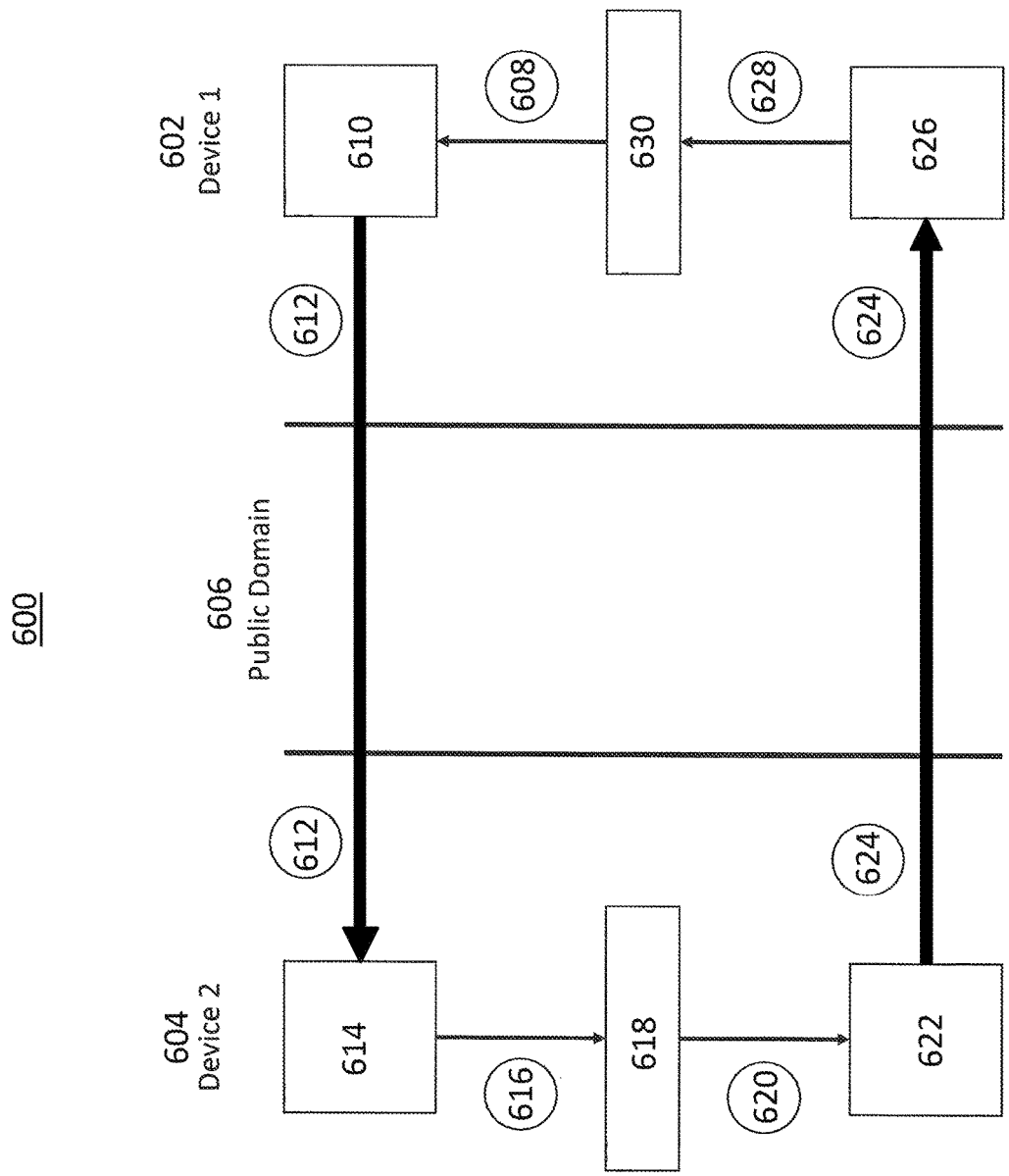
FIG. 6 is a flow diagram illustrating a method of reaching a consensus among a plurality of devices in accordance with an embodiment.

FIG. 6 is a flow diagram illustrating a method 600 of reaching a consensus among a plurality of devices before a key register is transmitted to each of the plurality of devices. The consensus problem is one of the basic problems arising in distributed coordination and control. Such a problem arises in a number of applications including, for example, heterogeneous devices in large-scale networks, and information processing and estimation in sensor networks such as a power grid. In a consensus problem, a set of devices each has some different initial value. The objective is to get the devices to agree on a common value by utilizing a distributed and local algorithm. The local algorithm can perform local computations and communicate with immediate neighboring devices.

A first device 602 starts with an initial value 608 that is passed through a set of functions 610 and converted to encrypted value 612. The set of functions 610 may be any non-linear function that adds noise to the initial value 608 or modifies it in some manner. For example, the set of functions may comprise a neural network or other non-linear functions generally known to persons of ordinary skill in the art. Next, the encrypted value 612 is transmitted over the public domain 606 to a second device 604. The second device 604 receives encrypted value 612 and decrypts the encrypted value 612 by using an inverse or an approximation of the inverse 614 of the set of functions 610, resulting in a decrypted value 616. The second device 604 then runs operations 618 to see if the value received from the first device 602 reaches a consensus. For example, the operations may utilize the following formula:

$$a(k+1)=A(k)x(k)=\alpha_k \xi(k), \quad (7)$$

where k is the number of communication cycles that has occurred, A is a matrix defined as $A(k)=(1-\alpha_k)I+\alpha_k W(k)$, and W is a matrix of weights that are changed as each communication cycle occurs in order to gain consensus.

The operations 618 output an encrypted predicted value 620, which is passed through a set of functions 622, resulting in a value 624. As described above, the set of functions 622 may be any non-linear set of functions. The value 624 is transmitted to the first device 602, where the first device 602 decrypts the value 624 by using an inverse or an approximation of the inverse 626 of the set of functions 622, resulting in a decrypted value 628. The first device 602 then runs operations 630 to check if the value received from the second device 604 reaches a consensus. The operations 630 may be the same or similar to the operations performed on the second device 604.

The communication cycle in FIG. 6 continues until consensus is reached between the first device 602 and the second device 604. For the beginning of each cycle, a new initial value 608 is passed into the set of functions 610, converted to the encrypted value 612, and transmitted to the second device 604. The method 600 may require n number of cycles until consensus is reached. Once consensus is reached, a key register for future encrypted communications between the first and second devices 602, 604 is transmitted to the first and second devices 602, 604. These steps allow the devices to obtain the public keys securely, without requiring another means of communication to acquire the public keys as is typically required, such as e-mail, sms message, etc.

Figure 7:
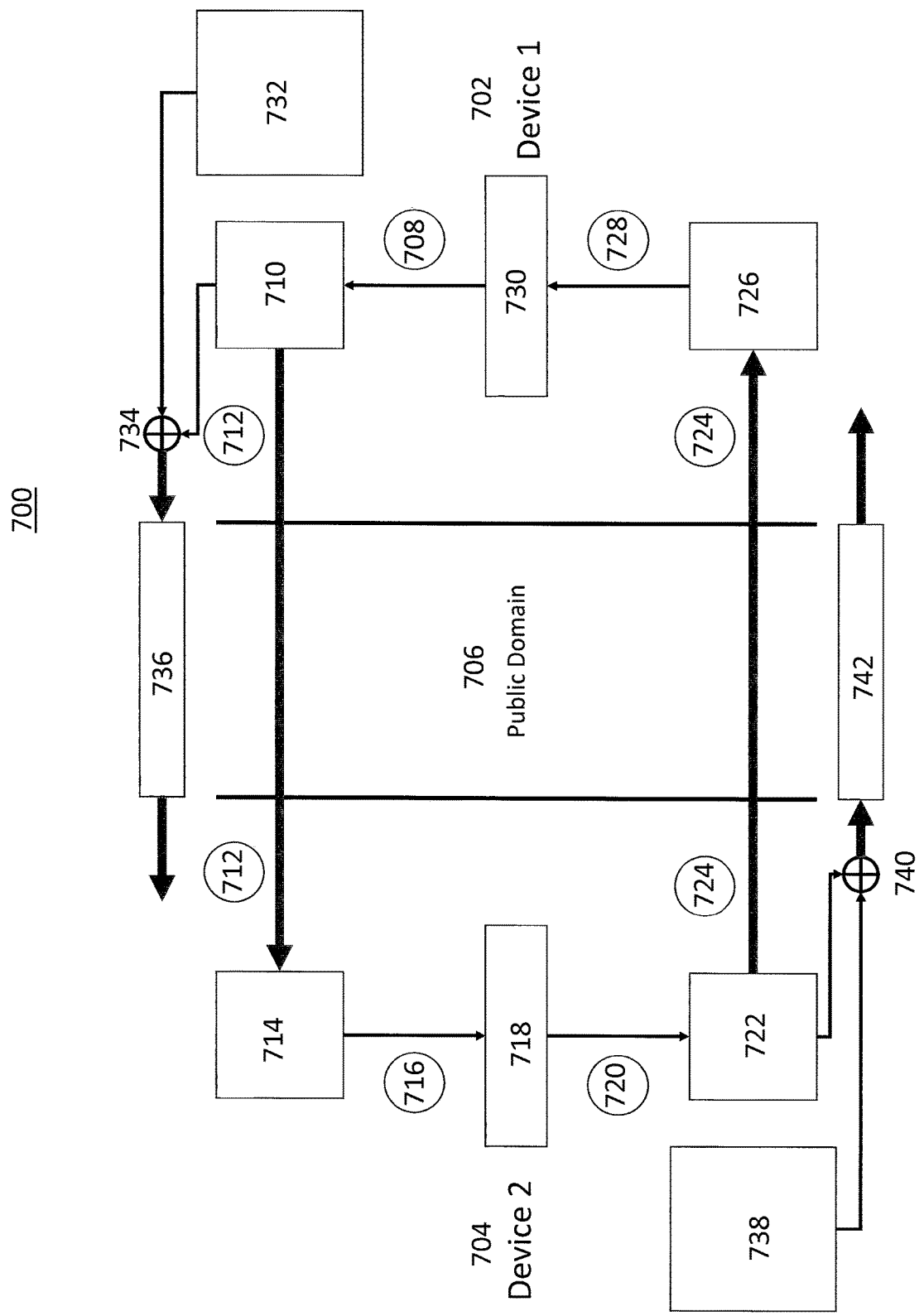
FIG. 7 is a flow diagram illustrating a method of reaching a consensus among a plurality of devices before transmitting an encrypted RSA key in accordance with an embodiment.

FIG. 7 is a flow diagram illustrating a method 700 of reaching a consensus among a plurality of devices before transmitting an encrypted RSA key to each of the plurality of devices. A first device 702 starts with an initial value 708 that is passed through a set of functions 710 and converted to encrypted value 712. The set of functions 710 may be any non-linear function that adds noise to the initial value 608 or modifies it in some manner, for example a neural network or other non-linear functions generally known to persons of ordinary skill in the art. Next, the encrypted value 712 is transmitted over the public domain 706 to a second device 704. The second device 704 receives encrypted value 712 and decrypts the encrypted value 712 by using an inverse or an approximation of the inverse 714 of the set of functions 710, resulting in a decrypted value 716. The second device 704 then runs operations 718 to see if the value received from the first device 702 reaches a consensus. For example, the operations 718 may utilize Formula (7) described above, where k is the number of communication cycles that has occurred, A is a matrix defined as $A(k)=(1-\alpha_k)I+\alpha_k W(k)$, and W is a matrix of weights that are changed as each communication cycle occurs in order to gain consensus.

The operations 718 output an encrypted predicted value 720, which is passed through a set of functions 722, resulting in a value 724. As described above, the set of functions 722 may be any non-linear set of functions. The value 724 is transmitted to the first device 702, where the first device 702 decrypts the value 724 by using an inverse or an approximation of the inverse 726 of the set of functions 722, resulting in a decrypted value 728. The first device 702 then runs operations 730 to check if the value received from the second device 704 reaches a consensus. The operations 730 may be the same or similar to the operations performed on the second device 704.

The communication cycle in FIG. 7 continues until consensus is reached between the first device 702 and the second device 704. For the beginning of each cycle, a new initial value 708 is passed into the set of functions 710, converted to the encrypted value 712, and transmitted to the second device 704. The method 700 may require n number of cycles until consensus is reached. Once consensus is reached, an RSA public key 732 for the first device 702 is passed through an XOR logic gate 734 or any other suitable logic gate along with the consensus value. The encrypted RSA key 736 is then sent to the second device 704, where an inverse operation may be performed to attain the sender's public RSA key. Similarly, once consensus is reached, an RSA public key 738 for the second device 704 is passed through an XOR logic gate 740 or any other suitable logic gate along with the consensus value. The encrypted RSA key 742 is then sent to the first device 704, where an inverse operation may be performed to attain the sender's public RSA key.

Figure 8:
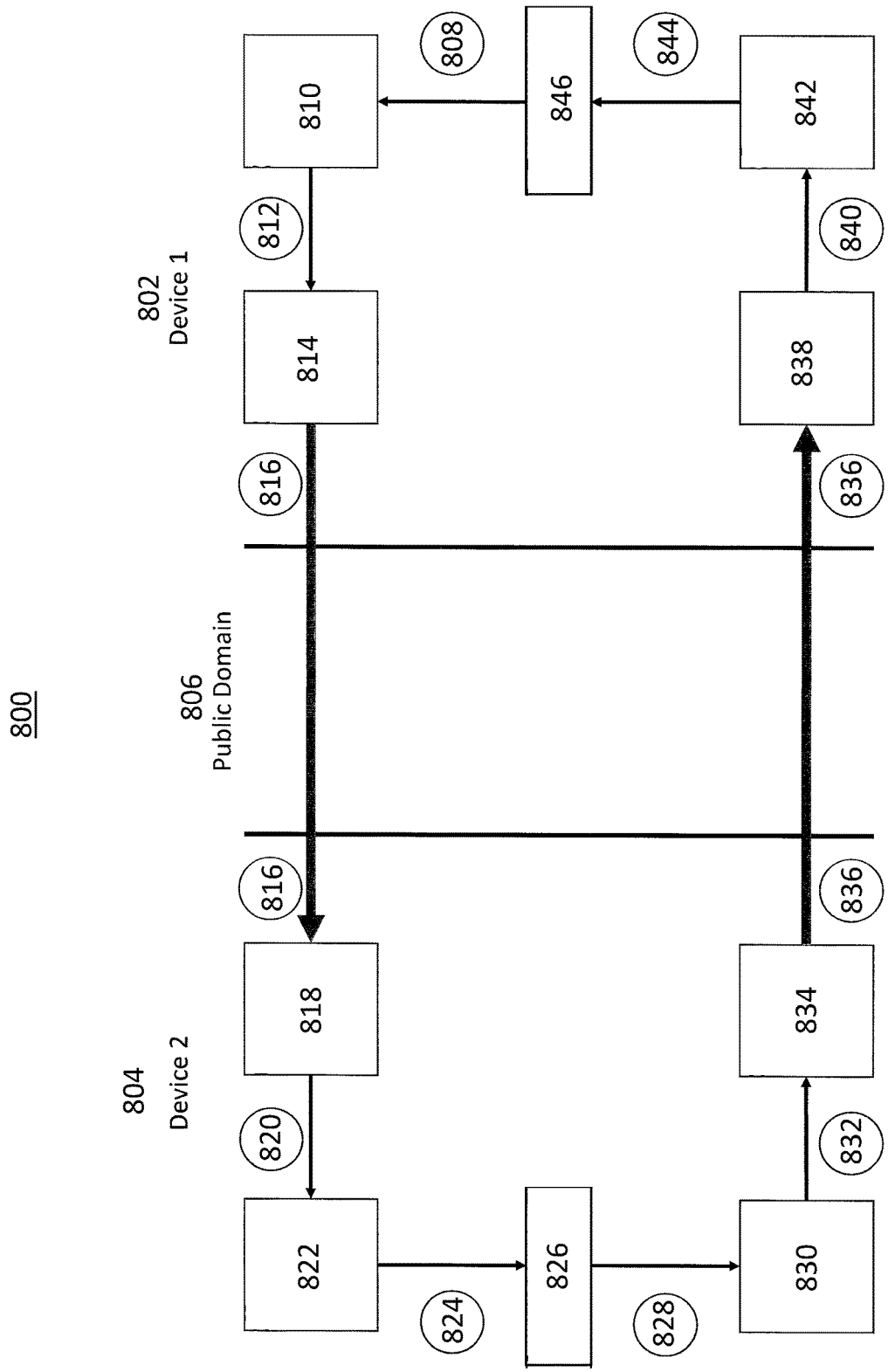
FIG. 8 is a flow diagram illustrating a method of reaching a consensus among a plurality of devices before transmitting a key register in accordance with an embodiment.

FIG. 8 is a flow diagram illustrating a method 800 of reaching a consensus among a plurality of devices before transmitting a key register for future encrypted communications between the plurality of devices. A first device 802 starts with an initial value 808 that is passed through a set of functions 810 and converted to encrypted value 812. As described above, the set of functions 810 may be any non-linear set of functions. Next, the first device 802 RSA encrypts 814 the encrypted value 812, to create a new value 816. The new value 816 is transmitted to the second device 804 over the public domain 806. The second device 804 RSA decrypts 818 the new value 816 to get a RSA-decrypted value 820. The second device 804 then further decrypts the RSA-decrypted value 820 by using an inverse or an approximation of the inverse 822 of the set of functions 810, resulting in a decrypted value 824. The second device 804 then runs operations 826 to check if the value received from the first device 802 reaches a consensus. For example, the operations 826 may utilize Formula (7) described above, where k is the number of communication cycles that has occurred, A is a matrix defined as $A(k)=(1-\alpha_k)I+\alpha_k W(k)$, and W is a matrix of weights that are changed as each communication cycle occurs in order to gain consensus.

The operations 826 outputs an encrypted predicted value 828, which is passed through a set of functions 830, resulting in a value 832. As described above, the set of functions 830 may be any non-linear set of functions. The second device 804 then RSA-encrypts 834 the value 832, and transmits an RSA-encrypted value 836 to the first device 802 over the public domain 806. The first device 802 then RSA-decrypts 838 the RSA-encrypted value 836, and further decrypts the resulting RSA-decrypted value 840 by using an inverse or an approximation of the inverse 842 of the set of functions 830, resulting in a decrypted value 844. The first device 802 then runs operations 846 to check if the value received from the second device 804 reaches a consensus. The operations 846 may be the same or similar to the operations performed on the second device 804.

The communication cycle in FIG. 8 continues until consensus is reached between the first device 802 and the second device 804. For the beginning of each cycle, a new initial value 808 is passed into the set of functions 810 to start the process anew. The method 800 may require n number of cycles until consensus is reached. Once consensus is reached, a key register for future encrypted communications between the first device 802 and the second device 804 is transmitted to the first device 802 and the second device 804.

Figure 9:
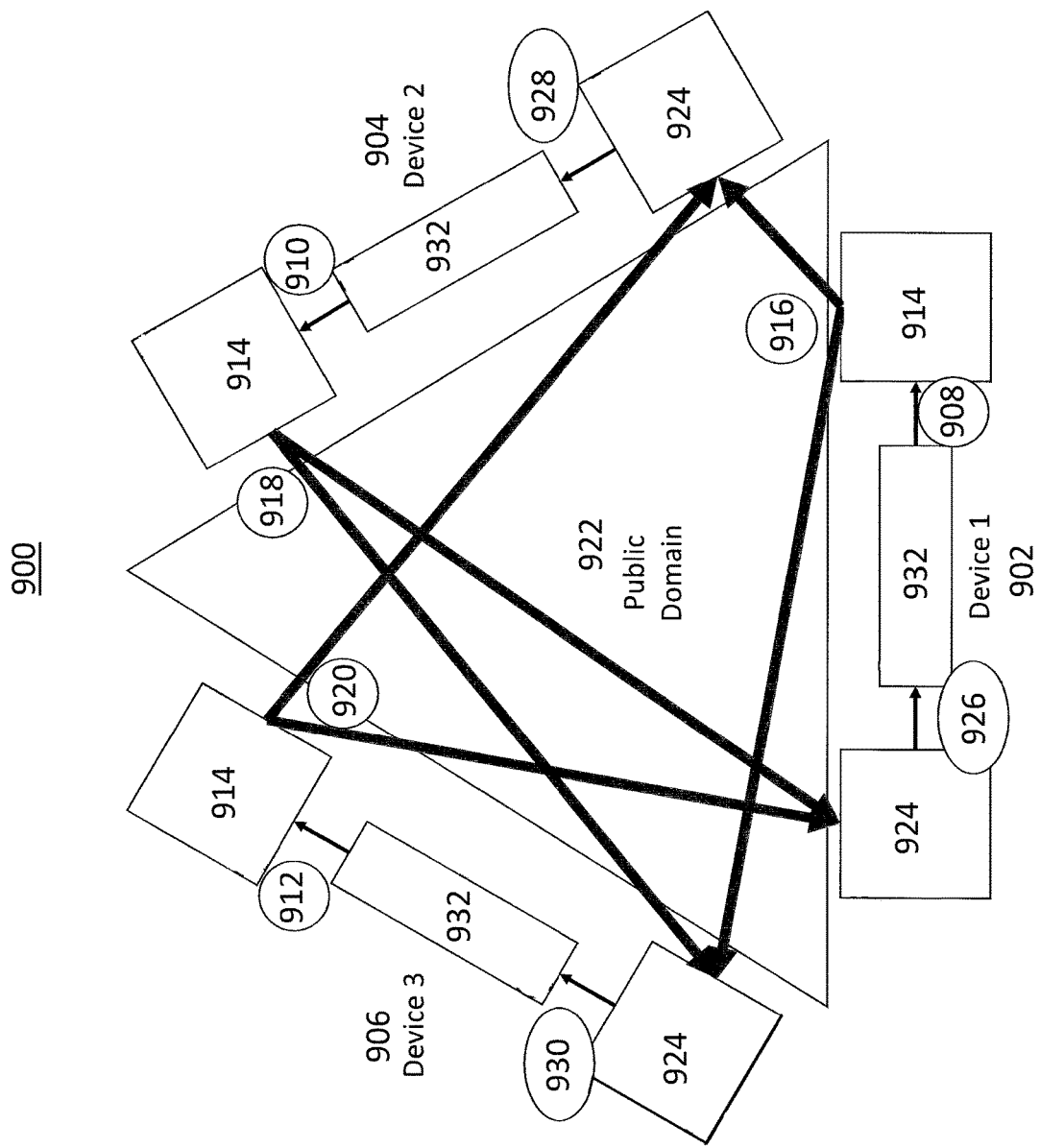
FIG. 9 is a flow diagram illustrating a method for obtaining consensus between a plurality of devices in accordance with an embodiment.

FIG. 9 illustrates a method 900 for obtaining consensus between a plurality of devices, for example a first device 902, a second device 904, and a third device 906. Each respective device 902, 904, 906 encrypts its own respective values 908, 910, 912 using a set of functions 914. As described above, the set of functions 914 may be any non-linear set of functions. Values 908, 910, 912 are encrypted as encrypted values 916, 918, 920, respectively, and transmitted over the public domain 922 to all other devices. While FIG. 9 illustrates three devices, it is understood that the method may be used for two or more devices.

Each respective device 902, 904, 906 receives the other devices' values and decrypts them using an inverse or an approximation of the inverse 924 of the set of functions 914. This step converts the encrypted values 916, 918, 920 into decrypted values 926, 928, 930. Each respective device then runs operations to see if the decrypted values 926, 928, 930 received from other devices reach consensus. For example, the operations may utilize Formula (7), discussed above, where k is the number of communication cycles that has occurred, and A is a matrix defined as $A(k)=(1-\alpha_k)I+\alpha_k W(k)$, and W is a matrix of weights that are changed as each communication cycle occurs in order to gain consensus.

The communication cycle in FIG. 9 continues until consensus is reached between the first, second, and third devices 902, 904, 906. For the beginning of each cycle, each of the respective devices 902, 904, 906 transmit new values 908, 910, 912. The method may require n number of cycles until consensus is reached. Once consensus is reached, a key register for future encrypted communications between the devices 902, 904, 906 is transmitted to each of the devices.

Method 900 utilizes a chaotic neural network to learn key register information by adding noise into the public domain 922 until a consensus is reached. This method may be utilized by any number of connected devices, and may also be layered such that a first consensus may be reached by all devices (for example, between the first, second, and third devices 902, 904, 906) and a second consensus may be reached between a subset of those devices (for example, between the first and third devices 902 and 906) if a private connection between the first and third devices 902, 906 is desired.

The methods described above avoid the need to use large keys for RSA encryption. The computational speed required for RSA encryption is a function of key length. The longer the key length, the longer the computational time and processing power needed. The methods described above combine advantages of multiple types of encryption, for example RSA and CNN, to allow for real-time encryption applications when an incorrect real-time decision may hurt or destabilize the system. In these applications, a fast encryption/decryption method is needed.

While hybrid encryption methods and systems have been described in connection with the various embodiments of the various figures, it is to be understood that other similar embodiments may be used or modifications and additions may be made to the described embodiments of hybrid encryption methods and systems without deviating therefrom. For example, one skilled in the art will recognize that the hybrid encryption methods and systems as described in the instant application may apply to any suitable cryptography method for encrypting the initial values of the CNN cryptography, such as Blowfish, Twofish, AES, PGP (Pretty Good Privacy), etc. Furthermore, it is understood that the hybrid encryption methods and systems described herein may be used in both real-time and off-line communication. Applications for the hybrid encryption methods and systems may be in control systems, automation, manufacturing, and the service industry. The encrypted data may be a wide range of sensor data, actuator command data, image data, or text data, among others. Therefore, the hybrid encryption methods and systems described herein should not be limited to any single embodiment, but rather should be constructed in breadth and scope in accordance with the appended claims.

What is claimed is:

1. A hybrid encryption method, the method comprising:
providing an encrypting chaotic neural network (CNN) having a plurality of paths through a plurality of layers to a first device, each layer being configured to scramble data, each path through the plurality of layers being dependent upon a set of initial values;
generating a set of initial values by the first device;
encrypting data, by the first device using the encrypting CNN and the set of initial values, to form an encrypted ciphertext;
encrypting the initial values, by the first device, to form encrypted initial values;
transmitting the encrypted ciphertext and the encrypted initial values, by the first device, to a second device, the second device being configured to decrypt the encrypted initial values and to use the decrypted initial values and a decrypting CNN to decrypt the encrypted ciphertext, the decrypting CNN being structured and trained in exactly the same way as the encrypting CNN;
generating, by the first device, a second set of initial values corresponding to a password;
encrypting the password, by the first device using the encrypting CNN and the second set of initial values, to form an encrypted password;
encrypting the second set of initial values to form a second set of encrypted initial values; and
transmitting the encrypted password and the second set of encrypted initial values to the second device, the second device being configured to decrypt the second set of encrypted initial values and to use the second set of initial values and the decrypting CNN to decrypt the password.

2. The method according to claim 1, further comprising:
decrypting the second set of initial values;
decrypting the password, by the second device, using the decrypting CNN and the second set of initial values;
confirming the decrypted password is correct;
decrypting the set of initial values by the second device; and
decrypting the data, by the second device, using the decrypting CNN and the set of initial values.

3. The method according to claim 1, wherein:
the data is plaintext;
a first function uses the initial values to generate a chaotic noise vector; and
the encrypting CNN is a chaotic function logic block that uses the chaotic noise vector to generate the ciphertext.

4. The method according to claim 3, wherein the chaotic function logic block comprises a plurality of chaotic function logic blocks in parallel.

5. The method according to claim 4, wherein the plaintext is broken into segments to be passed into the parallel chaotic function logic blocks.

6. The method according to claim 5, wherein the segments are reassembled after passing through the parallel chaotic function logic blocks into one segment of ciphertext.

7. The method according to claim 6, further comprising the steps of:
prior to passing the plaintext into the parallel chaotic function logic blocks, passing the plaintext and a key register into a logic gate, and outputting the result to the parallel chaotic function logic blocks.

8. The method according to claim 7, wherein the logic gate is an exclusive-or logic gate.

9. The method according to claim 3, further comprising the step of:
at the second device:
RSA-decrypting the plurality of initial values.

10. The method according to claim 9, further comprising the step of:
CNN-decrypting the ciphertext using the decrypted plurality of initial values.

11. A method for reaching a consensus among a plurality of devices, the method comprising:
passing an initial value through a first non-linear function, by a first device, to obtain an encrypted value;
transmitting the encrypted value by the first device to a second device over a public domain;
receiving the encrypted value by the second device;
decrypting the encrypted value, by the second device using an inverse or an approximation of the inverse of the first non-linear function, to obtain a decrypted value;
passing the decrypted value through at least one operation, by the second device, to determine whether a consensus is reached between the first device and the second device, the at least one operation generating an encrypted predicted value;
passing the encrypted predicted value through at least a second non-linear function, by the second device, to obtain a new value;
transmitting the new value by the second device to the first device;
receiving the new value by the first device;
decrypting the new value, by the first device using an inverse or an approximation of the inverse of the second non-linear function, to generate a new decrypted value; and
passing the new decrypted value through at least one operation, by the first device, to determine whether a consensus is reached between the first device and the second device.

12. The method of claim 11, wherein all steps of claim 11 are repeated until a consensus is reached.

13. The method of claim 11, wherein:
the first device RSA-encrypts the encrypted value before transmitting it to the second device over the public domain; and
the second device RSA-decrypts the RSA-encrypted value.

14. The method of claim 11, further comprising:
exchanging a key register, by the first device and the second device, after consensus is reached.

15. The method of claim 11, further comprising:
after a consensus value is reached, passing a first RSA public key for the first device and the new decrypted value through a logic gate, resulting in an encrypted RSA key for the first device;
transmitting the encrypted RSA key for the first device by the first device to the second device; and
decrypting the RSA key for the first device by the second device.

16. The method of claim 15, further comprising the steps of:
after a consensus value is reached, passing a second RSA public key for the second device and the new decrypted value through a logic gate, resulting in an encrypted RSA key for the second device;
transmitting the encrypted RSA key for the second device by the second device to the first device; and
decrypting the RSA key for the second device by the first device.

17. The method according to claim 16, further comprising:
after exchanging the key register and the encrypted RSA keys between the first and second devices,
generating a plurality of initial values by the first device;
passing the plurality of initial values into a first function, by the first device, to generate a chaotic noise vector;
RSA-encrypting the plurality of initial values by the first device;
passing plaintext and the chaotic noise vector into a chaotic function logic block, by the first device, to generate ciphertext; and
transmitting the ciphertext and the RSA-encrypted initial values by the first device to the second device.

18. The method according to claim 17, further comprising:
receiving the ciphertext and the RSA-encrypted initial values by the second device;
RSA-decrypting the RSA-encrypted initial values; and
decrypting the ciphertext, by the second device, using a chaotic function block and the RSA-decrypted initial values.

19. The method according to claim 14, further comprising:
after exchanging the key register between the first and second devices,
generating a plurality of initial values by the first device;
passing the plurality of initial values into a first function, by the first device, to generate a chaotic noise vector;
RSA-encrypting the plurality of initial values;
passing plaintext and the chaotic noise vector into a chaotic function logic block, by the first device, to generate ciphertext; and
transmitting the ciphertext and the RSA-encrypted initial values to the second device.

20. A hybrid encryption system, comprising:
an encrypting chaotic neural network (CNN) having a plurality of paths through a plurality of layers to a first device, each layer being configured to scramble data, each path through the plurality of layers being dependent upon a set of initial values;
a decrypting CNN that is structured and trained in exactly the same way as the encrypting CNN;
a first device that:
generates a set of initial values;
encrypts data using the encrypting CNN and the set of initial values to form an encrypted ciphertext;
encrypts the initial values to form encrypted initial values;
transmits the encrypted ciphertext and the encrypted initial values;
generates a second set of initial values corresponding to a password;
encrypts the password, using the encrypting CNN and the second set of initial values, to form an encrypted password;
encrypts the second set of initial values to form a second set of encrypted initial values;
transmits the encrypted password and the second set of encrypted initial values to the second device; and
a second device that:
receives the encrypted ciphertext and the encrypted initial values;
decrypts the encrypted initial values;
uses the decrypted initial values and the decrypting CNN to decrypt the encrypted ciphertext;
receives the encrypted password and the encrypted initial values;
decrypts the set of values;
decrypts the password using the decrypting CNN and the second set of initial values; and
confirms that the decrypted password is correct.

* * * * *